(12) United States Patent
Hamilton et al.

(10) Patent No.: US 12,267,434 B2
(45) Date of Patent: Apr. 1, 2025

(54) SYSTEM AND METHOD FOR DEPLOYING A GENERATED WORK

(71) Applicant: O&BSolutions LLC, Oakland, CA (US)

(72) Inventors: Jeffrey Hamilton, Oakland, CA (US); Craig Drabik, Amherst, NY (US); Chuck Fried, Amherst, NY (US); Kelsey A. Parker, Mckinleyville, CA (US)

(73) Assignee: O&BSolutions LLC, Oakland, CA (US)

( * ) Notice: Subject to any disclaimer, the term of this patent is extended or adjusted under 35 U.S.C. 154(b) by 331 days.

(21) Appl. No.: 17/808,044

(22) Filed: Jun. 21, 2022

(65) Prior Publication Data
US 2023/0318839 A1 Oct. 5, 2023

Related U.S. Application Data (60) Provisional application No. 63/362,105, filed on Mar. 29, 2022.

(51) Int. Cl.
*H04L 9/32* (2006.01)
*H04L 9/00* (2022.01)
*H04L 9/08* (2006.01)

(52) U.S. Cl.
CPC ............ *H04L 9/3236* (2013.01); *H04L 9/006* (2013.01); *H04L 9/0819* (2013.01)

(58) Field of Classification Search
CPC ...... H04L 9/3236; H04L 9/0819; H04L 9/006
See application file for complete search history.

(56) References Cited

U.S. PATENT DOCUMENTS

| | | | |
|---|---|---|---|
| 8,316,237 B1 * | 11/2012 | Felsher | H04L 63/061 380/282 |
| 10,708,042 B1 | 7/2020 | Rubenstein et al. | |
| 2011/0099379 A1 | 4/2011 | Ganesan et al. | |
| 2013/0001290 A1 * | 1/2013 | Trajkovic | G07G 1/0063 235/375 |

(Continued)

FOREIGN PATENT DOCUMENTS

| | | |
|---|---|---|
| NL | 1001353 C1 | 4/1997 |
| WO | 2008015651 A2 | 2/2008 |

OTHER PUBLICATIONS

NPL Search Terms (Year: 2024).*

(Continued)

*Primary Examiner* — Syed A Zaidi
(74) *Attorney, Agent, or Firm* — Stephen M. De Klerk (57) ABSTRACT

A method includes creating a sample of the generated work, generating a unique identifier, associating the unique identifier with the registration, generating a physical copy of the unique identifier, attaching the physical copy to the sample, taking an image of the sample with the physical copy attached to the sample, and registering the image. The method may further include encrypting a representation of the generated work with a public key. The method may further include transmitting a licensed identifier to a remote data computer system, receiving an occurrence from the remote data computer system, and executing a compensation routine based on the occurrence.

18 Claims, 7 Drawing Sheets

(56) References Cited

U.S. PATENT DOCUMENTS

| | | | |
|---|---|---|---|
| 2015/0326570 A1* | 11/2015 | Publicover | G06F 3/017 |
| | | | 382/117 |
| 2016/0026907 A1* | 1/2016 | Schory | G06K 19/06112 |
| | | | 235/494 |
| 2016/0074281 A1 | 3/2016 | MacFarlane et al. | |
| 2018/0091745 A1 | 3/2018 | Hlomes | |
| 2018/0349893 A1* | 12/2018 | Tsai | G06Q 20/3821 |
| 2019/0195852 A1 | 6/2019 | Bryant, Jr. et al. | |
| 2020/0184560 A1 | 6/2020 | Crumb et al. | |
| 2020/0193368 A1* | 6/2020 | Bhatia | H04W 4/40 |
| 2021/0007287 A1 | 1/2021 | Alexander et al. | |
| 2021/0206562 A1* | 7/2021 | Wawrzynski | G06Q 10/0832 |
| 2021/0379131 A1* | 12/2021 | Alsayar | B65B 3/06 |
| 2022/0036366 A1 | 2/2022 | Wu | |
| 2022/0092669 A1 | 3/2022 | Abrahamian et al. | |
| 2022/0129718 A1* | 4/2022 | Roth | A23L 2/52 |
| 2022/0254445 A1* | 8/2022 | Bitter | H04L 63/102 |

OTHER PUBLICATIONS

"International Search Report and Written Opinion mailed on May 4, 2023", International Application No. PCTUS23/62207, (20 pages).

* cited by examiner

SYSTEM AND METHOD FOR DEPLOYING A GENERATED WORK

CROSS-REFERENCE TO RELATED APPLICATIONS

This application claims priority from U.S. Provisional Patent Application No. 63/362,105, filed on Mar. 29, 2022, all of which is incorporated herein by reference in its entirety.

BACKGROUND OF THE INVENTION

1). Field of the Invention

This invention relates to a system and a method for deploying a generated work.

2). Discussion of Related Art

Plant breeders and growers often engage in contracts wherein the plant breeder licenses the growing and selling of replicas (herein referred to as "copies") of a plant that the breeder has developed (referred to herein as a "sample"). It may be difficult later on to verify the exact cultivar that was created in the sample. Cultivars may be identified visually and chemically. Because the details of the cultivar and its date of creation are often not recorded, these issues may later become the subject matter of dispute. Once a contract has been established, it may be difficult to track when a copy is created, or to track how many copies have been created for purposes of invoicing and compensation.

SUMMARY OF THE INVENTION

The invention provides a method of deploying a generated work including creating, by a user computer processor of a user computer, a registration on a registration computer located remotely from the user computer, generating, by the user computer processor, a representation of a generated work, associating, by the user computer processor, the representation of the generated work with the registration on the registration computer, and storing, by a registration computer processor of the registration computer, the registration and the representation of the generated work in association with the registration on a registration computer storage device of the registration computer.

The method may further include creating a sample of the generated work, generating, by the registration computer processor, a unique identifier, associating, by the registration computer processor, the unique identifier with the registration, generating, by the user computer processor, a physical copy of the unique identifier, attaching the physical copy to the sample and taking an image of the sample with the physical copy attached to the sample, wherein the representation of the generated work includes the image.

The method may further include that the generated work is a plant.

The method may further include that the unique identifier is a QR code.

The method may further include inserting the sample and the physical copy into a bag, wherein the image is taken with the sample and the physical copy inside the bag.

The method may further include that the bag is sealed in a manner that displays tampering with the bag.

The method may further include that the bag is a see-through bag that allows for the image to be taken with visible light passing through a side of the bag towards a visible light image sensor.

The method may further include encrypting, by the user computer processor, the representation of the generated work with a public key, wherein the storing, by the registration computer processor, of the registration and the representation of the generated work in association with the registration on the registration computer storage device of the registration computer is executed privately without a publication that is accessible without permission from the user computer due to the encrypting of the representation of the generated work.

The method may further include that the representation of the generated work is a first data element that is stored in a first data field by the registration computer processor, further including generating, by the user computer processor, a second data element in addition to the representation of a generated work, storing, by a registration computer processor, the second data element in a second field in association with the registration, and decrypting, by the registration computer processor, one of the data elements, while not decrypting another one of the data elements, with a private key.

The method may further include storing, by the registration computer processor, the public key in association with the registration on the registration computer storage device of the registration computer, encrypting, by the registration computer processor, the private key with a password of a user of a user computer having the user computer processor, and decrypting, by the registration computer processor, the private key with the password, wherein the decryption of the private key causes the registration computer processor to decrypt the first data element.

The method may further include that the representation of the generated work includes at least a licensed identifier, further including transmitting, by the registration computer processor of the registration computer, the licensed identifier to a remote data computer system, wherein the remote data computer system uses the licensed identifier to determine an occurrence of the licensed identifier in a data store and transmits the occurrence to the registration computer if the occurrence exists in the data store, receiving, by the registration computer processor of the registration computer, the occurrence from the remote data computer system, and executing, by the registration computer processor of the registration computer, a compensation routine based on the occurrence.

The method may further include that the user computer processor is a first user computer processor, further including generating, by the registration computer processor, an offer associated with the registration, communicating, by the registration computer processor, the offer to a second user computer processor, receiving, by the user computer, an acceptance of the offer from the second user computer processor, and recording, by the user computer, a contract in association with the licensed identifier of the registration in response to receiving the acceptance.

The method may further include that the registration computer processor communicates the offer to the second user computer processor for display by the second user computer processor.

The method may further include encrypting, by the user computer processor, the contract of the generated work with a public key, wherein the storing, by the registration computer processor, of the registration and the contract of the generated work in association with the registration on the registration computer storage device of the registration computer is executed privately without a publication that is accessible without permission from the user computer due to the encrypting of the contract of the generated work, and decrypting, by the registration computer processor, a data element of the contract with a private key.

The method may further include that the first and second user computer processors each receive a copy of a data element of the contract that has been decrypted.

The method may further include encrypting, by the registration computer processor, the data element of the contract with a public key associated with the second user computer.

The method may further include that the registration computer processor decrypts one of the a data element of the contract associated with the registration, while not decrypting another one of the data elements of the registration.

The method may further include that the representation of the generated work includes at least one of an image of a sample of the generated work, a unique identifier, and a licensed identifier.

The method may further include generating, by the registration computer processor, a hash of data of the registration, and recording, by the registration computer processor, the hash in a ledger that is copied to a plurality of nodes.

The invention also provides a system for deploying a generated work including a user computer that may include a user computer processor, a user computer storage device connected to the user computer processor, a user computer set of instructions on the user computer storage device and executable by the user computer processor, including a registration module, executable by the user computer processor, to create a registration on a registration computer located remotely from the user computer, a representation generation module, executable by the user computer processor, to generate a representation of the generated work and an association module, executable by the user computer processor, to associate the representation of the generated work with the registration on the registration computer; and a registration computer that may include a registration computer processor, a registration computer storage device connected to the registration computer processor, a registration computer set of instructions on the registration computer storage device and executable by the registration computer processor, including a storing module, executable by the registration computer processor, to store the registration and the representation of the generated work in association with the registration on the registration computer storage device.

They system may further include a sample of the generated work, wherein the registration computer set of instructions further includes a unique identifier module, executable by the by the registration computer processor, to generate a unique identifier; and a unique identifier association module, executable by the registration computer processor, to associate the unique identifier with the registration, wherein the user computer set of instructions further includes a printer module, executable by the user computer processor, to generate a physical copy of the unique identifier for attaching the physical copy to the sample, and an imaging module, executable by the user computer processor, to take an image of the sample with the physical copy attached to the sample, wherein the representation of the generated work includes the image.

The system may further include that the generated work is a plant.

The system may further include that the unique identifier is a QR code.

The system may further include that a bag, wherein a physical copy of the sample is inserted into a bag, wherein the image is taken with the sample and the physical copy inside the bag.

The system may further include that the bag is sealed in a manner that displays tampering with the bag.

The system may further include that the bag is a see-through bag that allows for the image to be taken with visible light passing through a side of the bag towards a visible light image sensor.

The system may further include that the user computer set of instructions further includes a registration encryption module, executable by the user computer processor, to encrypt the representation of the generated work with a public key, wherein the storing, by a registration computer processor, of the registration and the representation of the generated work in association with the registration on the registration computer storage device of the registration computer is executed privately without a publication that is accessible without permission from the user computer.

The system may further include that the representation of the generated work is a first data element that is stored in a first data field by the registration computer processor, further including wherein the registration module is executable by the user computer processor to generate a second data element in addition to the representation of a generated work, wherein the storing module is executable by the user computer to store the second data element in a second field in association with the registration, wherein the registration computer set of instructions further includes a registration decryption module, executable by the registration computer processor, to decrypt one of the data elements, while not decrypting another one of the data elements, with a private key.

The system may further include a public key stored by the registration computer processor in association with the registration on the registration computer storage device of the registration computer, wherein the registration computer set of instructions further includes a private key encryption module, executable by the registration computer processor, to encrypt the private key with a password of a user computer having the user computer processor, and a private key decryption module, executable by the registration computer processor, to decrypt the private key with the password, wherein the decryption of the private key causes registration computer processor to decrypt the first data element.

The system may further include that the representation of the generated work includes at least a licensed identifier, wherein the registration computer set of instructions further includes a licensed identifier transmission module, executable by the registration computer processor, to transmit the licensed identifier to a remote data computer system, wherein the remote data computer system uses the licensed identifier to determine an occurrence of the licensed identifier in a data store and transmits the occurrence to the registration computer if the occurrence exists in the data store, an occurrence receiving module, executable by the registration computer processor, to receive the occurrence from the remote data computer system, and a compensation module, executable registration computer processor, to run a compensation routine based on the occurrence.

The system may further include that the user computer processor is a first user computer processor, wherein the registration computer set of instructions further includes a contract module, executable by the registration computer processor to generate an offer associated with the registration, to communicate the offer to a second user computer processor, to receive an acceptance of the offer from the second user computer processor, and to record a contract in association with the licensed identifier of the registration in response to receiving the acceptance.

The system may further include that the registration computer processor communicates the offer to the second user computer processor for display by the second user computer processor.

The system may further include that the registration computer set of instructions further includes a contract encryption module, executable by the user computer processor, to encrypt the contract of the generated work with a public key, wherein the storing, by the registration computer processor, of the registration and the contract of the generated work in association with the registration on the registration computer storage device of the registration computer is executed privately without a publication that is accessible without permission from the user computer due to the encrypting of the contract of the generated work, and a contract decryption module, executable by the registration computer processor, to decrypt a data element of the contract with a private key.

The system may further include that the first and second user computer processors each receive a copy of a data element of the contract that has been decrypted.

The system may further include that contract encryption module encrypts the data element of the contract with a public key associated with the second user computer.

The system may further include that the registration computer processor decrypts one of the data elements of the contract associated with the registration, while not decrypting another one of the data elements of the registration.

The system may further include that the representation of the generated work includes at least one of an image of a sample of the generated work, a unique identifier, and a licensed identifier.

The system may further include a distributed ledger integration module, executable by the registration computer processor to generate a hash of data of the registration and record the hash in a ledger that is copied to a plurality of nodes.

BRIEF DESCRIPTION OF THE DRAWINGS

The invention is further described by way of example with reference to the accompanying drawings, wherein.

DETAILED DESCRIPTION OF THE INVENTION

Figure 1:
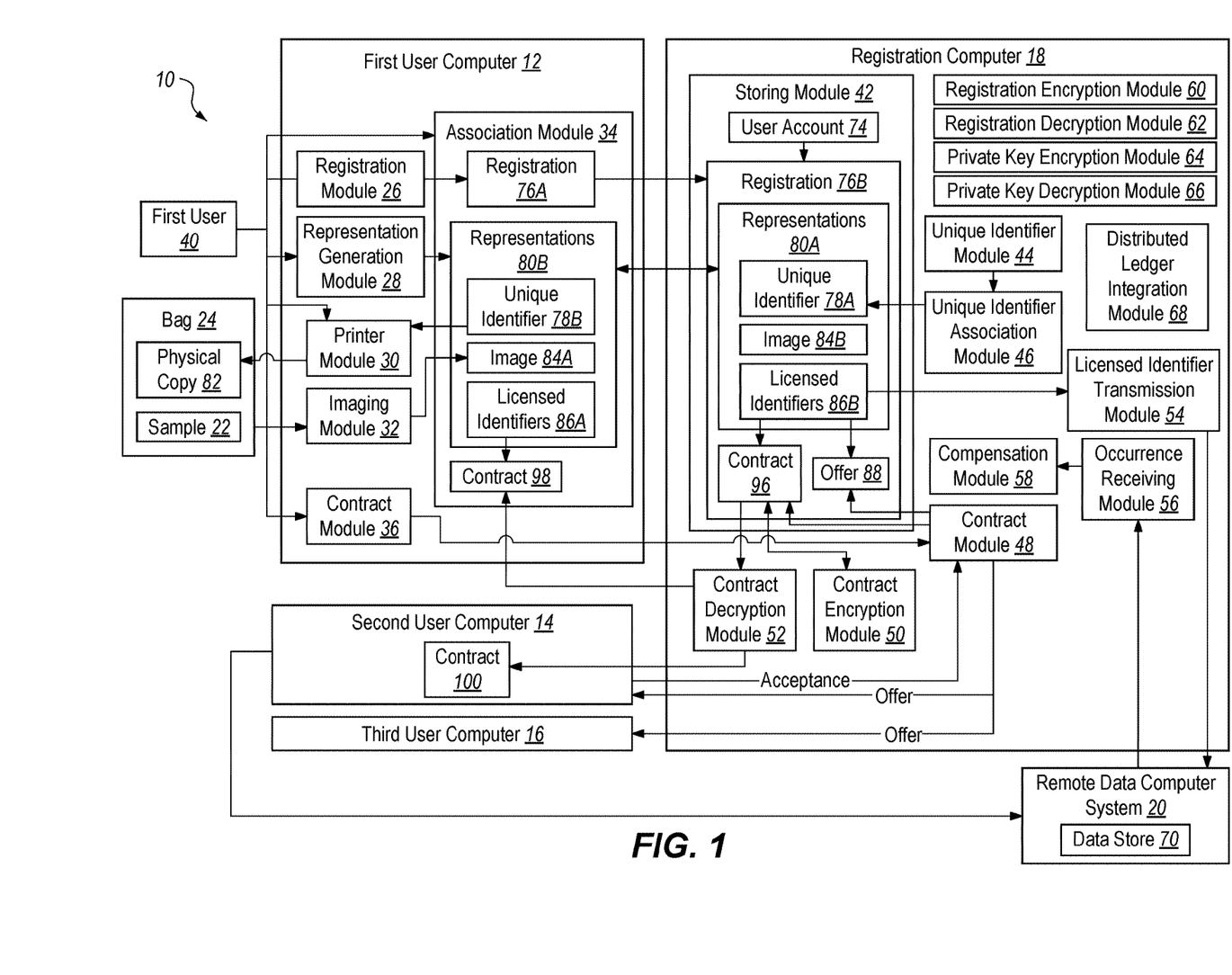
FIG. 1 is a block diagram of a system, according to the invention, for deploying a generated work.

FIG. 1 of the accompanying drawings illustrates a system 10 for deploying a generated work according to an embodiment of the invention. The system 10 includes first, second and third user computers 12, 14 and 16, a registration computer 18, a remote data computer system 20, a sample 22 of a generated work, and a transparent, tamper-evident bag 24.

Each user computer 12, 14 and 16 may be a desktop or laptop computer or a mobile device. For purposes of discussion, only the first user computer 12 will be described, and will be described as a mobile device having a resident app with intrinsic executable code. It should however be understood that a respective user computer may not have a dedicated app but instead have a browser that can access a web page on the registration computer 18. Such a browser may or may not download executable code from the registration computer 18 for execution on the respective user computer.

The first user computer 12 includes a registration module 26, a representation generation module 28, a printer module 30, an imaging module 32, an association module 34, and a contract module 36. The app has a user interface (not shown) that permits a first user to control various modules of the app, such as the registration module 26, the representation generation module 28, and the contract module 36.

The registration computer 18 includes a storing module 42, a unique identifier module 44, a unique identifier association module 46, a contract module 48, contract encryption and decryption modules 50 and 52 respectively, a licensed identifier transmission module 54, an occurrence receiving module 56, a compensation module, registration encryption and decryption modules 60 and 62, private key encryption and decryption modules 64 and 66, and a distributed ledger integration module 68.

The association module 34 and the storing module 42 are connected to one another over the Internet and can communicate bidirectionally with each other. The unique identifier module 44 is connected to the unique identifier association module 46. The licensed identifier transmission module 54 and the occurrence receiving module 56 are connected over the Internet to the remote data computer system 20. The compensation module 58 is connected to the occurrence receiving module 56. The contract decryption module 52 is connected to the first and second user computers 12 and 14.

The remote data computer system 20 has a data store 70. The data store 70 may for example be a data store that holds registrations for cannabis. Cannabis growth and sales are carefully monitored and tracked by governmental authorities in many legal jurisdictions. Because cannabis has to be registered and such registrations are recorded on data stores such as the data store 70 of the remote data computer system 20, cannabis provides a suitable example to demonstrate the integrated functioning of the system 10 of FIG. 1. These integrations include sampling, imaging, registration, encryption and decryption, distributed ledger integration, contract/licensing, occurrence tracking and compensation. It should however be understood that many aspects of the system may find application for generated works other than cannabis, such as other plants or animals that do not normally form the subject matter of copyrightable works, or works that do form the subject matter of copyrightable works such as music, art, etc., or works that have other rights attached to them such as likeness, personal data, etc.

In use, the first user 40 uses the app on the first user computer 12 to establish a user account 74. The user account 74 includes a username and a password and is stored on a storage device of the registration computer 18 by the storing module 42.

The first user 40 then uses the registration module 26 to create a registration 76A that is stored on a storage device of the first user computer 12. The app sends the registration 76A to the registration computer 18. The storing module 42 stores the registration 76A as a registration 76B in association with the user account 74.

When the registration computer 18 stores the registration 76B, the unique identifier module 44 automatically generates a unique identifier. The unique identifier association module 46 stores the unique identifier as a unique identifier 78A in association with the registration 76B. The unique identifier 78A forms one of many representations 80A that are associated with the registration 76B. The registration computer 18 sends the unique identifier 78A to the first user computer 12, which stores the unique identifier 78A as a unique identifier 78B within representation 80B on the storage device of the first user computer 12. The representations 80A and 80B are continually synchronized between the registration computer 18 and the first user computer 12.

The first user 40 then uses the printer module 30 to create a physical copy 82 of the unique identifier 78B. The printer module 30 sends an image of the unique identifier 78B to a printer (not shown) and the physical copy 82 is a printout of the unique identifier 78B. The unique identifier 78B may for example be a quick response "QR" code.

The first user 40 then places the sample 22 and the physical copy 82 within the bag 24 and seals the bag 24. In the given example, the sample 22 is a sample of a cannabis plant that has been developed by the first user 40. The bag 24 is a tamper proof bag that is sealed in a manner that displays if the bag has been tampered with. Because the bag 24 is a see-through bag, the physical copy 82 and the sample 22 are both visible through a side of the bag 24.

The first user 40 then uses the imaging module 32 and a camera of the first user computer 12 to take an image of the bag 24. Visible light passes from the physical copy 82 and the sample 22 through a side of the bag towards a visible light image sensor of the camera. The image thus includes the bag 24, the physical copy 82 and the sample 22. The imaging module 32 stores the image as an image 84A within the representations 80B. Because the representations 80A and 80B are bidirectionally synchronized, the image 84A is also stored as an image 84B within the representations 80A.

The distributed ledger integration module 68 then creates a record of the registration 76B at a node of a distributed ledger. The distributed ledger integration module 68 generates a hash of data of the registration 76B and records the hash within a ledger that is then copied to a plurality of nodes. The registration encryption module 60 encrypts the registration 76B. The registration 76B has a number of data elements, for example, the unique identifier 78A and the image 84B. Each one of these data elements may be separately encrypted while one or more of the data elements are not encrypted. The data elements are typically decrypted by the registration decryption module 62 when the user is logged in to the user account 74.

The user may choose to add further representations within the representations 80B that are synchronized with the representations 80A. The user may for example add genus and species information for a plant. Of particular importance is that the user can add licensed identifiers 86A to the representations 80B. The licensed identifiers 86A may for example be stock keeping unit (SKU) codes that are separately generated and then entered by the user using the representation generation module 28. Should the user for example wish to license ten copies of the cannabis plant to a grower, the user may enter ten licensed identifiers within the licensed identifiers 86A. The licensed identifiers 86A are synchronized with the registration computer 18 and are stored as licensed identifiers 86B within the representations 80A.

The first user 40 then uses the contract module 36 forming part of the app on the first user computer 12 to communicate with a contract module 48 on the registration computer 18. The first user 40 creates an offer and the contract module 48 stores the offer as an offer 88 in association with the registration 76B. The offer 88 remains unencrypted so that the contract module 48 can access the offer 88. The contract module 48 forwards the offer 88 to the second and third user computers 14 and 16. The apps on the first, second and third user computers 12, 14 and 16 may for example have browsers that a respective user can use to receive the offer 88. Each user account such as the user account 74 may have multiple registrations such as the registration 76B that can be viewed by other users. There may also be multiple user accounts, each with multiple registrations and offers associated with the registrations than can be viewed by other users.

The second user at the second user computer 14 uses the contract module of the app on the second user computer 14 to send an acceptance of the offer to the contract module 48. In response to receiving the acceptance, the contract module 48 records a contract 96 in association with the registration 76B. The contract may for example be that the second user may create ten copies of the sample 22 in exchange for compensation of twenty dollars per copy. The offer 88 has assigned ten of the licensed identifiers 86B to the contract 96.

The distributed ledger integration module 68 generates a hash of the contract 96 and records the hash within the ledger on the distributed ledger node system. The contract encryption module 50 encrypts the contract 96 so that it is not viewable by the registration computer 18 or any other users such as a user of the third user computer 16. The contract decryption module 52 decrypts the contract 96 and sends copies of the contract 96 to the first and second user computers 12 and 14, as represented by the contracts 98 and 100, respectively.

The first user 40 may then send information or supplies to the second user that the second user may need in order to make copies of the sample 22. The first user 40 may for example send seedlings to the second user, and the second user may grow the seedlings and sell all or parts of each grown plant according to the terms of the contract.

The second user is required to record the licensed identifiers 86B for each one of the copies that has been created on the data store 70 of the remote data computer system 20. The second user may for example record the SKU numbers of grown and sold cannabis plants on the data store 70.

The licensed identifier transmission module 54 periodically transmits the licensed identifiers 86B that are associated with the contract 96 to the remote data computer system 20. The remote data computer system 20 then checks an occurrence of each of the licensed identifiers 86B in the data store 70. In the present example, there is a one-to-one relationship between occurrences and licensed identifiers. Another system may make use of a data store where a single licensed identifier is recorded in the data store and the number of copies that are recorded against the single licensed identifier. The remote data computer system 20 returns any occurrences in the data store 70 to the occurrence receiving module 56. The occurrence receiving module 56, in response to receiving any occurrences, activates the compensation module 58 to compensate the first user 40 according to the terms of the contract 96. Each user may for example have an account on the registration computer 18 and one account is debited while another account is credited. Alternatively, the compensation module 58 may integrate with an external service to process the transfer of the payment. In either case, a portion of the payment is held back by the registration computer 18 for the service.

Figure 2:
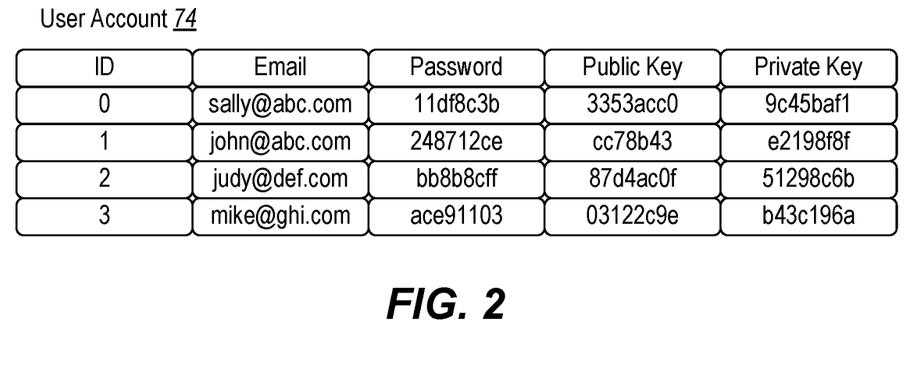
FIG. 2 is a user table showing how private keys are encrypted or decrypted for use within the system.

FIG. 2 illustrates the functioning of the private key encryption and decryption modules 64 and 66, respectively. Private keys are encrypted using a single key with the password of the respective user serving as the key. Passwords are never stored. A one-way cryptographically secure hash is calculated from the password and stored in the database. Public keys are stored in plain text. The public key is used to encrypt the data such that only the private key can decrypt the data.

Figure 3:
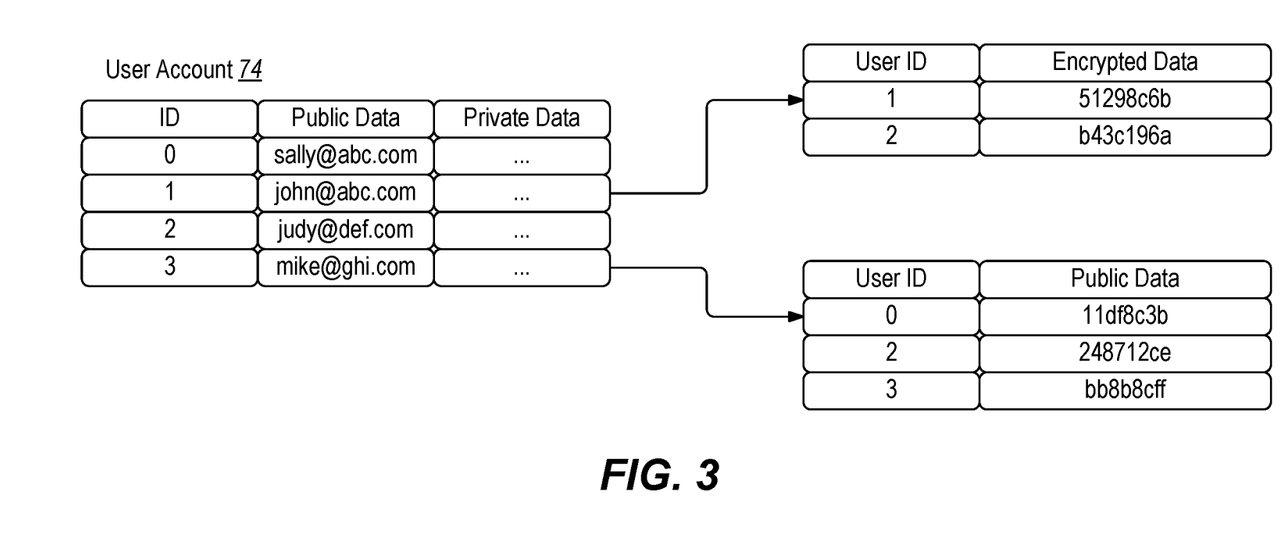
FIG. 3 is a table illustrating selective encryption of public and private data associated with respective accounts.
Figure 4:
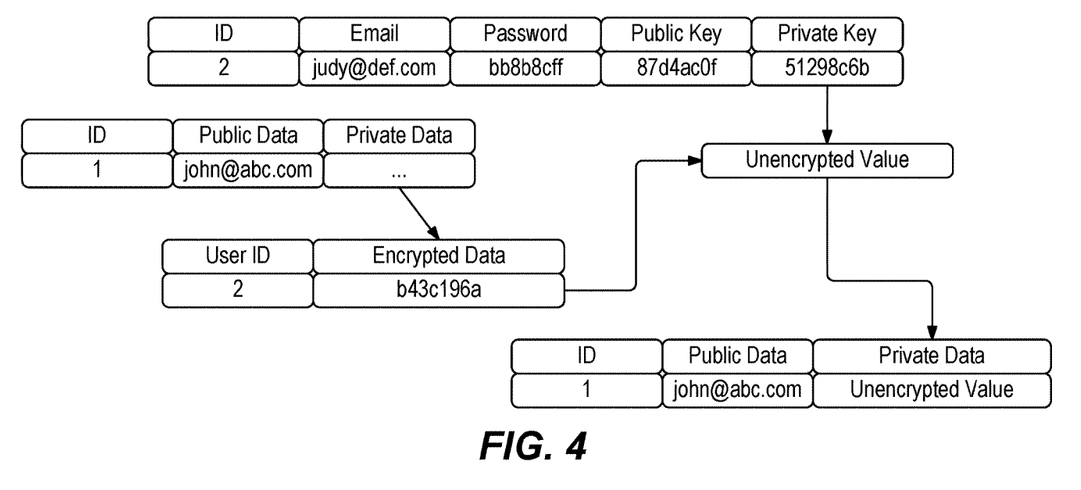
FIG. 4 shows various portions of the table of FIG. 3 illustrating how different data fields may be encrypted or decrypted for different users.

FIG. 3 illustrates selective encryption and decryption by the registration encryption decryption modules 60 and 62 and the contract encryption and decryption modules 50 and 52. As shown in the example table on left, a table can contain a mix of private and public information. Encryption is applied at the field-level for columns marked as private. As shown in the tables on the right, each user that has access to encrypted data (either the owner of the data or those with whom it was shared) has their own independent copy of each field that has been encrypted using the particular user's public key. The encrypted data can only be decrypted by the particular user's private key and the private key is only available to the system while the user is logged in. As is further shown in FIG. 4, when the system retrieves data on behalf of a particular user, it retrieves that user's copy of each encrypted field and decrypts those encrypted fields using the user's private key.

Figure 5:
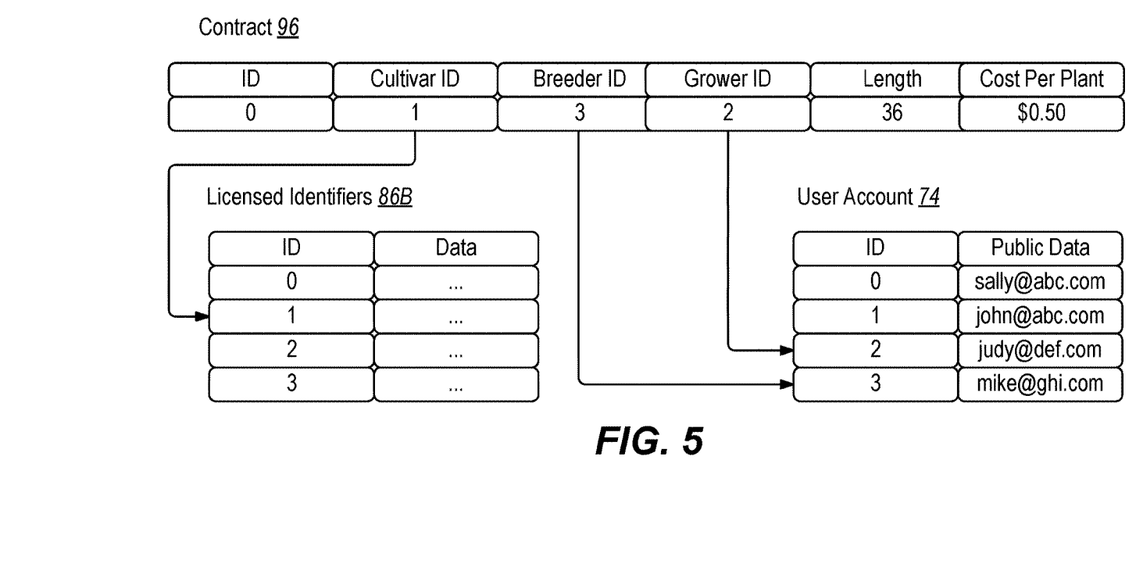
FIG. 5 illustrates a database structure for a conventional database.

FIG. 5 illustrates what a contract might look like in a traditional relational database. Data about a contract is mostly made of relationships, for example pointers to the cultivar, breeder and grower involved in the contract. In a relational database these relationships cannot be encrypted without breaking the ability of the database to collect the data.

Figure 6:
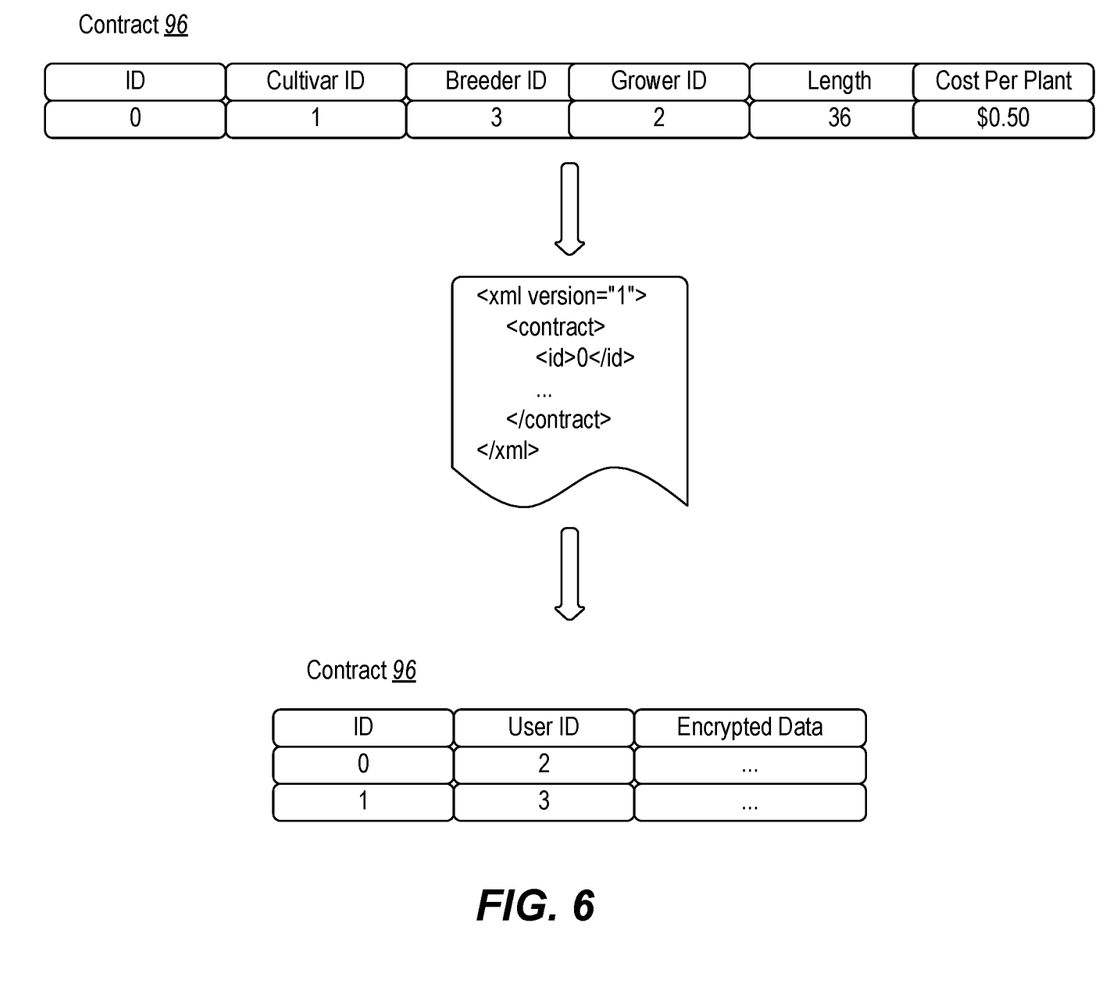
FIG. 6 illustrates a how a contracts table is structured for selected fields to be encrypted.

FIG. 6 illustrates a database wherein the contract data is kept private as described with reference to FIG. 1. Instead of storing data using a typical relational database model, the application stores the entire row as Extensible Markup Language (XML). The XML is encrypted and stored uniquely for both the first user 40 in FIG. 1 and the second user (for example, breeder and grower in the case of cannabis or other plants). Each party receives their own unique copy that is only readable using the correct private key.

Figure 7:
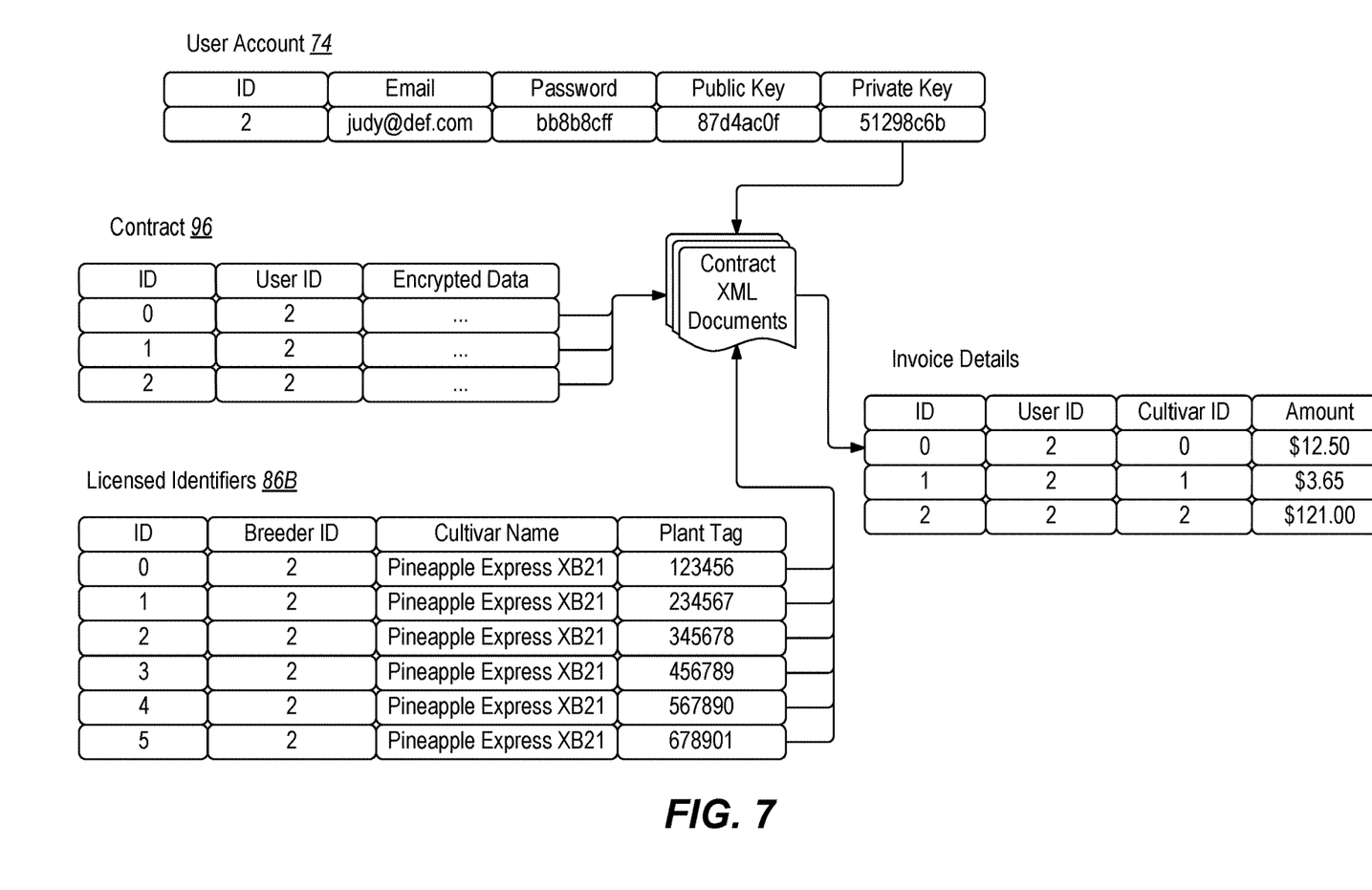
FIG. 7 illustrates integration of the user account data, contracts data, license identifiers and invoice details.

As shown in FIG. 7, when a user logs in to the system, the contracts specific to that user are decrypted. Either the first or the second user can trigger this process, because each user has their own encrypted copy of the contract. As shown on the right, once the contracts are decrypted, the data from the remote data computer system 20 in FIG. 1 can be matched and invoice details can be generated. Sensitive parts of the invoice data itself are encrypted and a copy is generated for both the first and second users.

Figure 8:
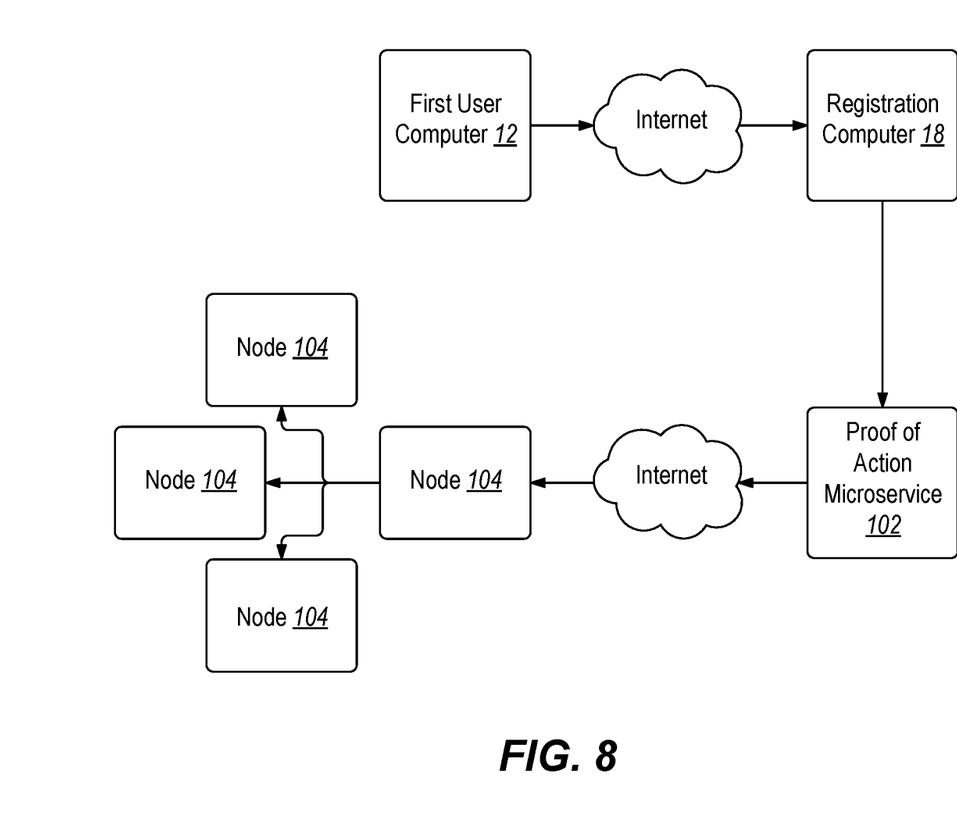
FIG. 8 is a block diagram illustrating the functioning of a proof of action microservice to record dates in a distributed ledger system.

FIG. 8 illustrates the functioning of a distributed ledger system. The registration computer 18 is connected to a proof of action microservice 102, which in turn is connected over the Internet to a plurality of nodes 104. The registration computer 18 and the proof of action microservice 102 are both located behind a firewall and communicate with one another over a local network or the Internet. The proof of action microservice 102 communicates with one of the nodes 104. All communications over the Internet are encrypted in an architecture of the network of the nodes 104. When the proof of action microservice 102 generates a hash of a registration or a contract and records the hash in a ledger at one of the nodes 104, a time and date stamp is created in the ledger that can later be used as a proof that the work or the contract was registered on a particular time and date.

Figure 9:
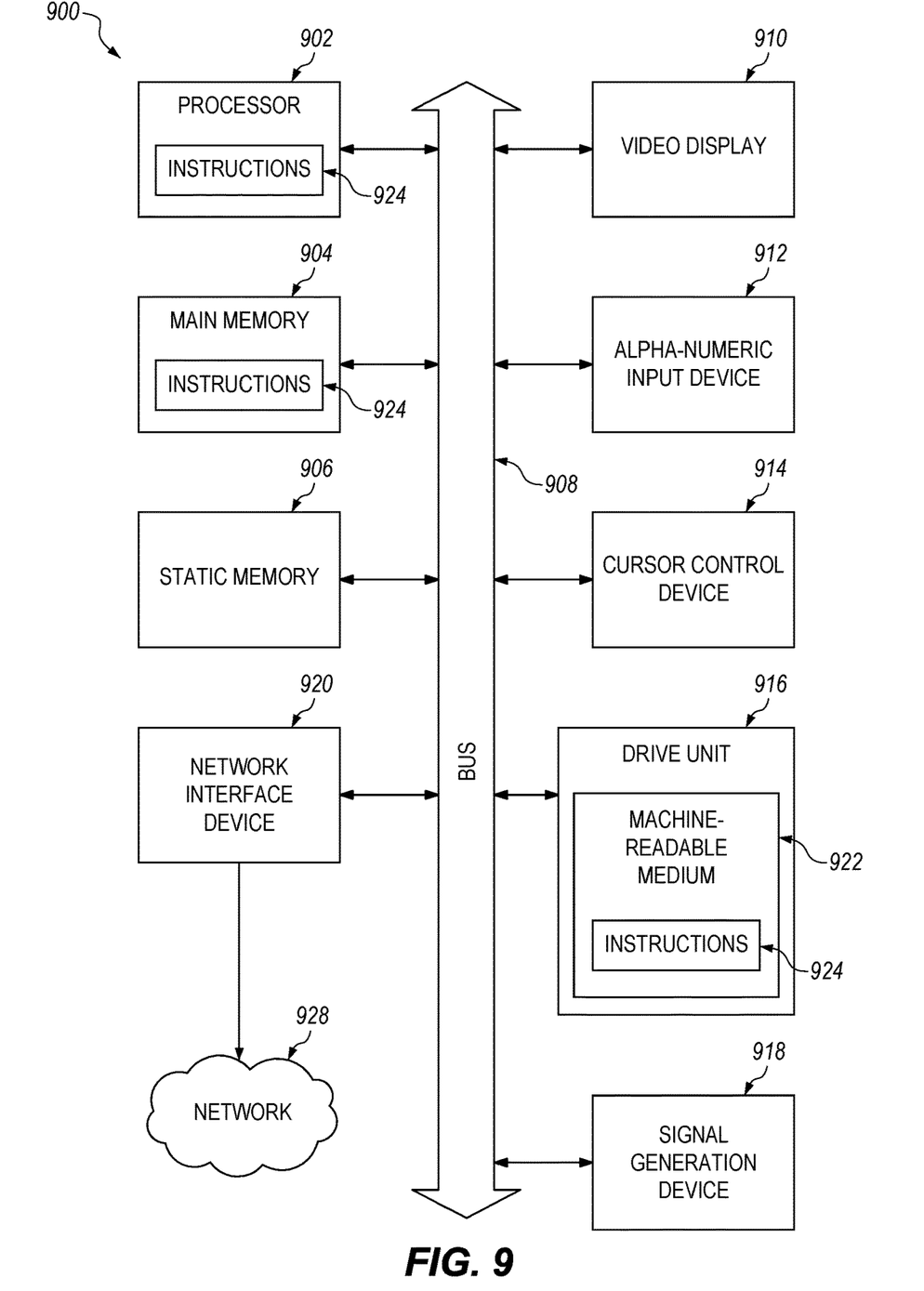
FIG. 9 is a block diagram of a machine in the form of a computer that can find application in the present invention system, in accordance with one embodiment of the invention.

FIG. 9 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A method of deploying a generated work comprising:
creating, by a user computer processor of a user computer, a registration on a registration computer located remotely from the user computer;
generating, by the registration computer processor, a unique identifier;
associating, by the registration computer processor, the unique identifier with the registration;
generating, by the user computer processor, a physical copy of the unique identifier;
attaching the physical copy to a sample of the generated work;
taking an image of the sample with the physical copy attached to the sample;
associating, by the user computer processor, the image with the registration on the registration computer;
storing, by a registration computer processor, the registration and the image in association with the registration on a registration computer storage device of the registration computer;
transmitting, by the registration computer processor, the licensed identifier to a remote data computer system, wherein the remote data computer system uses the licensed identifier to determine an occurrence of the licensed identifier in a data store and transmits the occurrence to the registration computer if the occurrence exists in the data store;
receiving, by the registration computer processor, the occurrence from the remote data computer system; and
executing, by the registration computer processor, a compensation routine based on the occurrence.

2. The method of claim 1, wherein the generated work is a plant.

3. The method of claim 1, wherein the unique identifier is a QR code.

4. The method of claim 1, further comprising:
inserting the sample and the physical copy into a bag, wherein the image is taken with the sample and the physical copy inside the bag.

5. The method of claim 4, wherein the bag is sealed in a manner that displays tampering with the bag.

6. The method of claim 5, wherein the bag is a see-through bag that allows for the image to be taken with visible light passing through a side of the bag towards a visible light image sensor.

7. The method of claim 1, further comprising:
encrypting, by the user computer processor, the representation of the generated work with a public key, wherein the storing, by the registration computer processor, of the registration and the representation of the generated work in association with the registration on the registration computer storage device of the registration computer is executed privately without a publication that is accessible without permission from the user computer due to the encrypting of the representation of the generated work.

8. The method of claim 1, wherein the representation of the generated work includes at least one of:
an image of a sample of the generated work;
a unique identifier; and
a licensed identifier.

9. The method of claim 1, further comprising:
generating, by the registration computer processor, a hash of data of the registration; and
recording, by the registration computer processor, the hash in a ledger that is coped to a plurality of nodes.

10. A system for deploying a generated work comprising:
a user computer that includes:
a user computer processor;
a user computer storage device connected to the user computer processor;
a user computer set of instructions on the user computer storage device and executable by the user computer processor, including:
a registration module, executable by the user computer processor, to create a registration on a registration computer located remotely from the user computer;
a unique identifier module, executable by the by the registration computer processor, to generate a unique identifier;
a unique identifier association module, executable by the registration computer processor, to associate the unique identifier with the registration;
a printer module, executable by the user computer processor, to generate a physical copy of the unique identifier for attaching the physical copy to a sample of the generated work;
an imaging module, executable by the user computer processor, to take an image of the sample with the physical copy attached to the sample; and
an association module, executable by the user computer processor, to associate the image with the registration on the registration computer; and
a registration computer that includes:
a registration computer processor;
a registration computer storage device connected to the registration computer processor; and
a registration computer set of instructions on the registration computer storage device and executable by the registration computer processor, including:
a storing module, executable by the registration computer processor, to store the registration and the image in association with the registration on the registration computer storage device, wherein the representation of the generated work includes at least a licensed identifier;
a licensed identifier transmission module, executable by the registration computer processor, to transmit the licensed identifier to a remote data computer system, wherein the remote data computer system uses the licensed identifier to determine an occurrence of the licensed identifier in a data store and transmits the occurrence to the registration computer if the occurrence exists in the data store;

an occurrence receiving module, executable by the registration computer processor, to receive the occurrence from the remote data computer system; and a compensation module, executable registration computer processor, to run a compensation routine based on the occurrence.

11. The system of claim 10, wherein the generated work is a plant.

12. The system of claim 10, wherein the unique identifier is a QR code.

13. The system of claim 11, further comprising:

a bag, wherein a physical copy of the sample is inserted into a bag, wherein the image is taken with the sample and the physical copy inside the bag.

14. The system of claim 13, wherein the bag is sealed in a manner that displays tampering with the bag.

15. The system of claim 14, wherein the bag is a see-through bag that allows for the image to be taken with visible light passing through a side of the bag towards a visible light image sensor.

16. The system of claim 10, wherein the user computer set of instructions further includes:

a registration encryption module, executable by the user computer processor, to encrypt the representation of the generated work with a public key, wherein the storing, by a registration computer processor, of the registration and the representation of the generated work in association with the registration on the registration computer storage device of the registration computer is executed privately without a publication that is accessible without permission from the user computer.

17. The system of claim 10, wherein the representation of the generated work includes at least one of:

an image of a sample of the generated work;
a unique identifier; and
a licensed identifier.

18. The system of claim 10, further comprising:

a distributed ledger integration module, executable by the registration computer processor to:

generate a hash of data of the registration; and
record the hash in a ledger that is coped to a plurality of nodes.

* * * * *